(12) United States Patent
Murray (10) Patent No.: US 11,332,282 B2
(45) Date of Patent: May 17, 2022

(54) POUCH FOR TRANSPORTATION AND STORAGE OF NATURAL MATERIALS

(71) Applicant: Pouch Pac Innovations, LLC, Sarasota, FL (US)

(72) Inventor: R. Charles Murray, Sarasota, FL (US)

(73) Assignee: POUCH PAC INNOVATIONS, LLC, Sarasota, FL (US)

( * ) Notice: Subject to any disclaimer, the term of this patent is extended or adjusted under 35 U.S.C. 154(b) by 208 days.

(21) Appl. No.: 15/400,264

(22) Filed: Jan. 6, 2017

(65) Prior Publication Data

US 2017/0113841 A1    Apr. 27, 2017

Related U.S. Application Data

(63) Continuation-in-part of application No. 14/864,216, filed on Sep. 24, 2015.

(Continued)

(51) Int. Cl.
| | | |
|---|---|---|
| *B65D 33/00* | (2006.01) | |
| *B65D 30/22* | (2006.01) | |
| *B65D 33/04* | (2006.01) | |
| *B65D 33/25* | (2006.01) | |

(Continued)

(52) U.S. Cl.
CPC ........... *B65D 33/004* (2013.01); *B65D 31/12* (2013.01); *B65D 33/04* (2013.01);
(Continued)

(58) Field of Classification Search
CPC ...... B65D 33/004; B65D 33/04; B65D 33/25; B65D 33/2508; B65D 33/2566; B65D 33/2591; B65D 27/04; B65D 27/08; B65D 2203/02; B65D 2215/04; B65D 31/12; B65D 33/008; B65D 33/2516; B65D 33/2525; B65D 33/2541; B65D 33/255; B65D 33/2558; B65D 33/2575; B65D 33/2583; B65D 65/08; G06Q 30/018; H04B 5/0031; A45C 13/103; A45C 13/1023

(Continued)

(56) References Cited

U.S. PATENT DOCUMENTS

| | | | |
|---|---|---|---|
| 4,744,673 A | * | 5/1988 Nakamura | ............. B65D 31/04 383/38 |
| 5,533,810 A | | 7/1996 Jensen | |

(Continued)

*Primary Examiner* — Andrew D Perreault
(74) *Attorney, Agent, or Firm* — Dinsmore & Shohl LLP (57) ABSTRACT

A flexible pouch comprising a first panel and a second panel. In one embodiment there is a first compartment and a second compartment formed between the first panel and the second panel. A top seal is positioned along the top of the first panel and the second panel above the first compartment and the second compartment. A locking child proof slider assembly is configured to close the top seal in one direction and permit access to the compartments in the other direction. Below the top seal and just above the compartments is a zip seal. The zip seal is reclosable and helps maintained the upper edge of the compartments keeping the contents in place and fresh. The first compartment includes at least one sidewall formed from the first panel and the second panel and at least one seam wherein the sidewalls of the first compartment are opaque to as to prevent visibility of the contents of the first compartment. An NFC tag may also be provided.

18 Claims, 7 Drawing Sheets

Related U.S. Application Data (60) Provisional application No. 62/182,840, filed on Jun. 22, 2015, provisional application No. 62/055,044, filed on Sep. 25, 2014.

(51) Int. Cl.
  *H04B 5/00* (2006.01)
  *B65D 50/06* (2006.01)

(52) U.S. Cl.
  CPC ..... *B65D 33/2508* (2013.01); *B65D 33/2541* (2013.01); *B65D 33/2566* (2013.01); *B65D 50/06* (2013.01); *H04B 5/0031* (2013.01); *H04B 5/0056* (2013.01); *B65D 2203/02* (2013.01); *B65D 2215/04* (2013.01)

(58) Field of Classification Search
  USPC ........................ 206/216; 383/38–40, 61.3, 97
  See application file for complete search history.

(56) References Cited

U.S. PATENT DOCUMENTS

| | | | |
|---|---|---|---|
| 2004/0140233 A1* | 7/2004 | Ajootian | A45C 11/008 206/216 |
| 2006/0027478 A1 | 2/2006 | Kaufman et al. | |
| 2008/0240628 A1* | 10/2008 | VanLoocke | B65B 29/10 383/210 |
| 2011/0243482 A1* | 10/2011 | First | B65D 33/004 383/72 |
| 2012/0281934 A1* | 11/2012 | Dytchkowskyj | B65D 31/10 383/64 |
| 2014/0298757 A1* | 10/2014 | Chapek | B65D 50/00 53/492 |
| 2014/0367295 A1* | 12/2014 | Murray | B65D 33/004 206/459.5 |

* cited by examiner

POUCH FOR TRANSPORTATION AND STORAGE OF NATURAL MATERIALS

CROSS-REFERENCE TO RELATED APPLICATIONS

This application depends from and claims priority to U.S. patent application Ser. No. 14/864,216 filed on Sep. 24, 2015, which in turn claims priority to U.S. Provisional Application No. 62/055,044 filed on Sep. 25, 2014 and U.S. Provisional Application No. 62/182,840 filed on Jun. 22, 2015, all of which are incorporated herein by reference.

FIELD OF THE INVENTION

The present invention relates generally to a pouch. More specifically, the present invention related to container for packaging a product of natural materials.

BACKGROUND OF THE INVENTION

Certain natural materials are sold from bulk containers to consumers. These materials, such as tobacco, medical marijuana, and the like, are displayed in bulk containers. The goods are then placed in containers for transport and storage by the consumer. Various types of containers have been utilized such as plastic bags with a zipper or zip lock type closure at the top of the package. However, such containers are not satisfactory for use with many materials including medical marijuana.

SUMMARY OF THE INVENTION

A flexible pouch comprising a first panel and a second panel. A first compartment and a second compartment are formed between the first panel and the second panel. A seal positioned on the first and second panels between the first compartment and the second compartment. The first compartment includes at least one sidewall formed from the first panel and the second panel wherein the two sidewalls of the first compartment are opaque to as to prevent visibility of the contents of the first compartment.

In one embodiment, the first compartment and the second compartment are secured by a child proof lock. The child proof lock is connected to a zip seal, the zip seal being resealable where the zip seal permits access to both the first compartment and the second compartment.

In the present embodiment, the first compartment and the second compartment are resealable. In one embodiment, the first compartment is opaque and the second compartment is transparent to allow the user to view the contents contained within the second compartment.

An NFC tag is connected to the pouch. The NFC tag is adapted to store readable information relating to the origination of the contents of the pouch. In one embodiment, the NFC tag is affixed to the exterior of the pouch. Alternatively, the NFC tag in contained within wither the first compartment or the second compartment.

In an alternative embodiment, the flexible pouch includes a first compartment and a second compartment where a seal positioned between the first compartment and the second compartment. The first compartment being opaque to as to prevent visibility of the contents of the first compartment. In this embodiment, an NFC tag is connected to the flexible pouch, the NFC tag adapted to store readable information relating to the origination of the contents of the pouch.

DETAILED DESCRIPTION OF THE PREFERRED EMBODIMENTS

The present apparatus is a flexible pouch for use with storing and transporting medical marijuana in oil and/or leaf form. The flexible pouch is generally rectangular shaped having at least two compartments. One compartment is formed to hold marijuana in either oil or leaf form. Another compartment is formed to hold a card having information about the dispensary and contents. A third compartment may be included to hold a snack such as, without limitation, cookies. The pouch is formed of two strips of laminate material. One strip is a top panel formed of laminate having a layer of ethylene vinyl alcohol. The other strip is a bottom panel which may be formed of the same material or be a laminate having a layer of aluminum.

Figure 1:
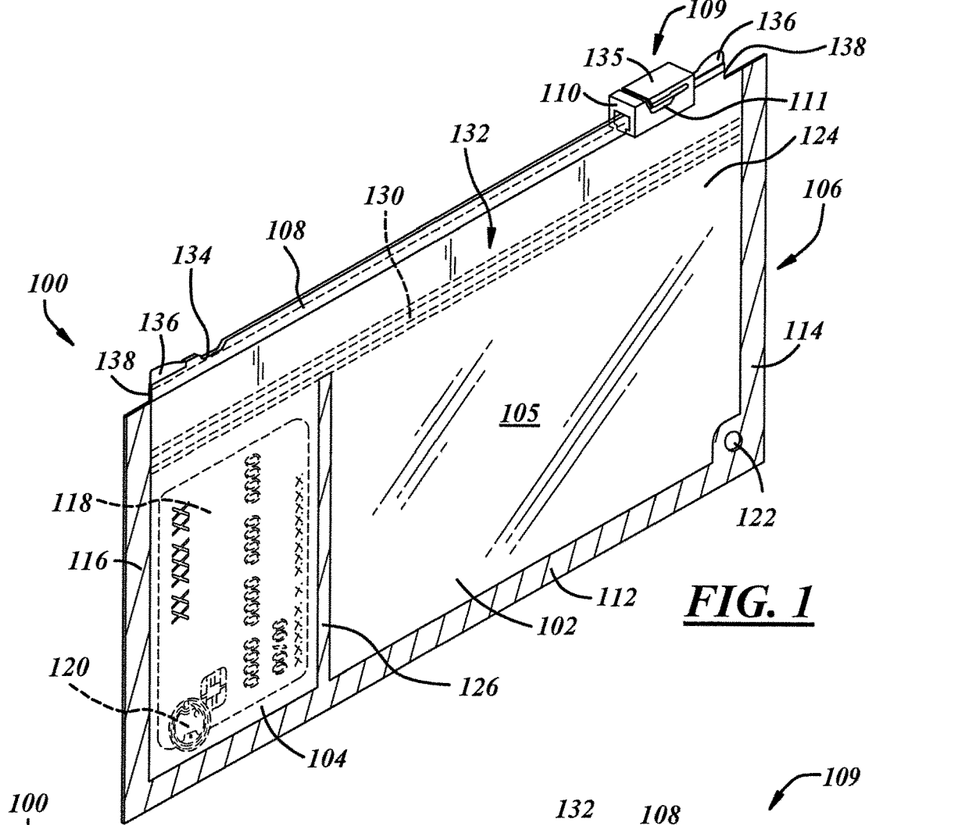
FIG. 1 illustrates a perspective view of the pouch.
Figure 2:
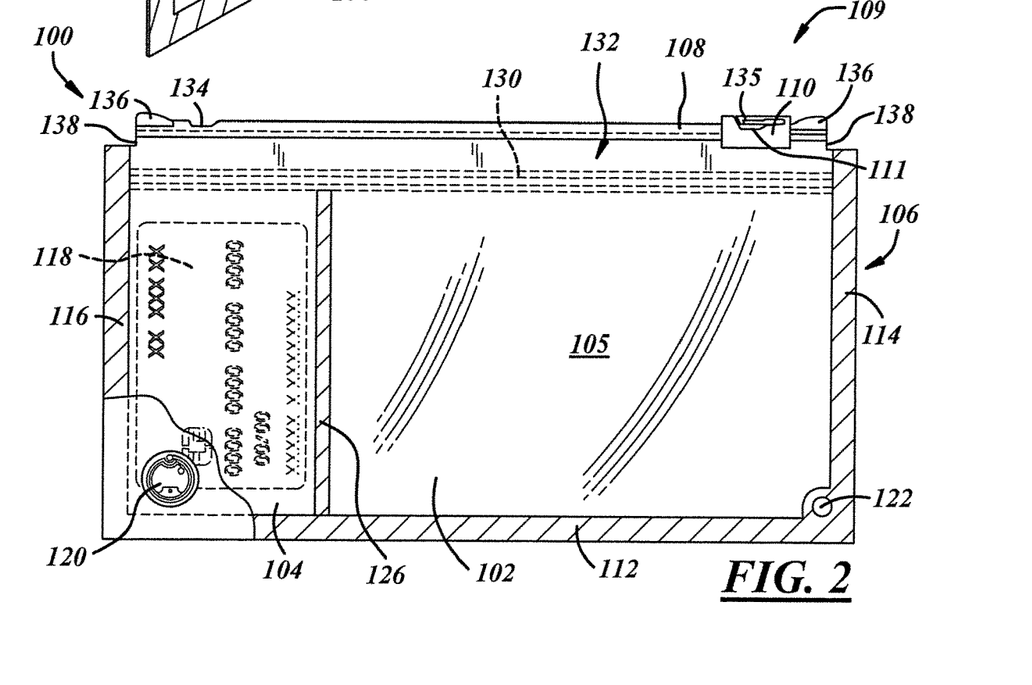
FIG. 2 illustrates a front view of the pouch as shown in FIG. 1.
Figure 3:
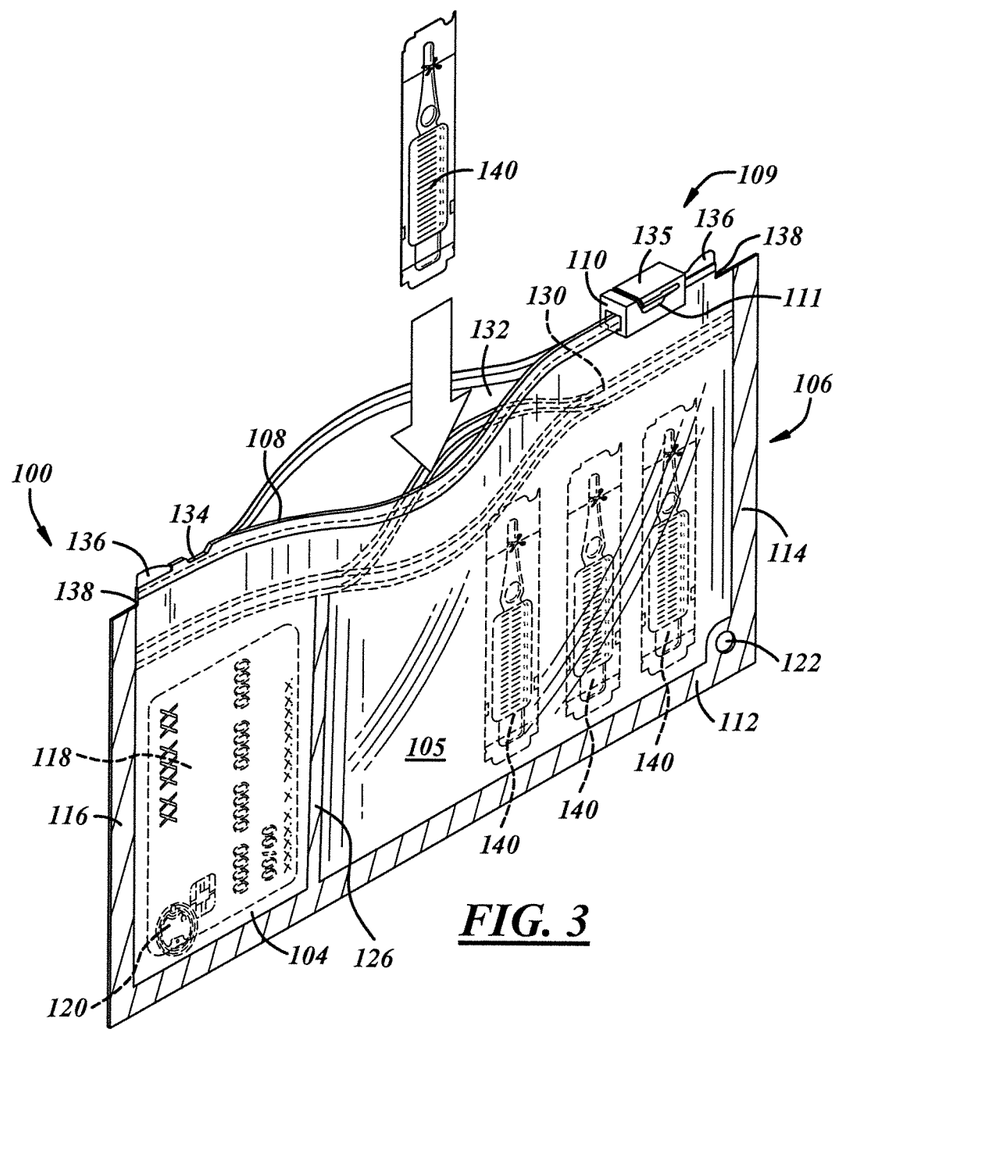
FIG. 3 illustrates the pouch as illustrated in FIGS. 1-2 further including a plurality of vials containing oil.

FIGS. 1-3 illustrate a pouch 100 have two compartments: a first compartment 102 and a second compartment 104. In the first embodiment (such as shown in in FIGS. 1-3), the first compartment 102 is configured to hold medical marijuana and the second compartment 104 is configured to hold a business card 118. Alternatively, the second compartment 104 may hold rolling papers, advertisements, information about the product . . . etc.

The compartments 102, 104 are formed from two panels 105, 106. A first panel 105 is sealed to a second panel 106. In the present embodiment, the pouch is generally rectangular having a plurality of peripheral side seals 112, 114, 116. The seals 112, 114, 116 are preferably air and water tight so as to prevent air or liquid from entering the first compartment 102 or the second compartment 104.

The first and second compartments 102, 104 are generally rectangular pouches or envelopes configured to hold a product. In the present embodiment, the first and second compartments 102, 104 are sealed on all peripheral edges except an upper edge 108. The upper edge 108 of both the first compartment and the second compartments 102, 104 are sealed and secured by means of a slider assembly 109. Within the assembly 109 is a slider portion 110 that slides along the upper seal 108 either sealing the upper seal 108 in one direction or unsealing in the opposite direction. The slider portion 110 stops and locks at a receiving portion 136 just prior to each edge seal 114, 116 and at the seam notch 138 to allow full access to the compartments 102, 104. The slider 110 has a locking mechanism 111 to prevent unwanted access, for example access by children, into the contents of the first compartment 102 and the second compartment 104. The locking mechanism 111 unlocks the slider portion 110 from the receiving portion 136 by a lever 135. The lever 135 only actuates and thus unlocks when allowed to travel into the lever notch 134 thereby allowing the slidere portion 110 to release from the receiving portion 136. The lever 135 may only fit into the notch 134 when the slider portion 110 is fully seated into the receiving portion 136. Once the slider portion 110 is seated at the receiving portion 136 on either side, the lever 135 locks the slidere portion into receiving portion 136.

The first compartment 102 is separated from the second compartment 104 by means of a first seam 126. The first seam 126 acts as a barrier between the first compartment 102 and the second compartment 104. The first seam 126 may be formed by heat seal and/or compression between the panels 105, 106.

The first compartment 102 is therefore formed between the first panel 105 and the second panel 106 and having a first side wall formed from seal 114 and the opposite second sidewall formed from the first seam 126. The first compartment 102 is generally larger than the second compartment 104.

In the present embodiment, below the upper seal 108 and below panel 132 is a zip seal 130 that is able to zip closed encasing the upper portion of compartments 102, 104. The first seam 126 ends at the base of zip seal 130 and does not extend through zip seal 130 into panel 132. The zip seal 130 may be closed while the top seal 108 is open and vice versa. The zip seal 130 extends horizontally between edge seal 114, 116 and between panels 105, 106. The zip seal 130 may help keep the contents in their respective compartments 102, 104 and/or keep the contents fresh.

The panels 105, 106 of the pouch described herein may be of a specific laminate such as described in the following. Specifically, the first panel and the second panel may be made of a laminate including three layers: an outer layer formed of PET having a thickness of approximately 12 microns, a center layer of aluminum having a thickness of approximately 9 microns, and an inner layer of S-LLDPE having a thickness of approximately 150 microns. This laminate provides a pouch which is airtight to preserve the longevity of the contents. The outer layer of PET is satisfactory for printing labeling information and warning information, the middle aluminum layer provides an airtight seal for the pouch, and the inner layer of S-LLDPE melts to form an adhesive for bonding the panels of the pouch together and to seal the fitment or closures in place. The aluminum also inherently dictates an opaque qualify for the panels.

In the present embodiment, an NFC tag 120 (near field code) is affixed to the pouch as shown in FIGS. 1-3. The NFC tag 120 uses electromagnetic induction between two loop antennae when NFC devices to exchange information, operating within the globally available unlicensed radio frequency ISM band of 13.56 MHz on ISO/IEC 18000-3 air interface and at rates ranging from 106 kbit/s to 424 kbit/s. Each full NFC device can work in three modes: NFC Card Emulation; NFC Reader/Writer; and NFC peer-to-peer (P2P mode). NFC Card emulation mode enables NFC-enabled devices such as smartphones to act like smart cards, allowing users to perform transactions such as payment or ticketing. NFC Reader/writer mode enables NFC-enabled devices to read information stored on inexpensive NFC tags embedded in labels or smart posters. NFC peer-to-peer mode enables two NFC-enabled devices to communicate with each other to exchange information in an adhoc fashion. The present system utilized peer-to-peer mode to enable a user to read the information contained on the NFC tag 120.

The NFC tag 120 contains data (typically between 96 and 8,192 bytes of memory) and are read-only, but may be rewritable. Applications aside from the present system include secure personal data storage (e.g. debit or credit card information, loyalty program data, Personal Identification Numbers (PINs), contacts).

In the present embodiment, the NFC tag 120 is provided with a unique code prior to or at the time of the formation of the pouch. The NFC tag is provided to permit the dispensary to readily enter information into a database about the pouch by use of an NFC tag reader. The information about the pouch is then associated into the database with information in the database about the patient. The information may include the patient's identity, address, age, etc. Additionally, the prescription is entered into the database, then finally the quantity and date of the purchase is entered in. This information is associated with the pouch number so that law enforcement personnel may associate the pouch with the purchase information any time in the future.

The NCF tag 120 may be placed within the pouch, affixed to the interior of either the first or second compartments, affixed to the exterior of either the first or second compartments and/or sealed between the first and second panels 105, 106. Any adhesive or other known fastener may be used to connect the NFC tag 120 to the pouch 100.

In the present embodiment, the NFC tag 120 is positioned on the exterior of the second compartment 104. However, the NFC tag 120 may be positioned anywhere within or on the pouch 100.

The pouch is formed by first providing a strip of laminate having a width equal to the height of the pouch. A rectangular portion is severed from the strip of laminate and folded over itself (thereby forming the two panels 105, 106). When the two edges align, a seal bar then seals the two edges together. The pouch is then filled with medical marijuana, rolling papers, business cards . . . etc. The pouch 100 is then moved to the final station where the NFC chip is glued (or otherwise affixed such as discussed above) to the pouch.

If the pouch includes a metal wall (i.e. aluminum), it is necessary to put a layer of insulating material between the NFC tag and the outer panel to allow the NFC tag to be free of interference from the aluminum layer of the laminate.

The first seam 126 is spaced apart a distance from one of the side seals 114, 116 to form one side of the second compartment 104. The other side of the second compartment is formed by the side seal 116. The second compartment 104 generally accepts a card such as a dispensary card and an NFC tag. The first seam 126 extends from the bottom seal 112 towards the top but ends at the base of the zip seal 130. The portion of the front panel 105 over the second compartment 104 is clear to enable printing on the card to be read through the panels. A layer of opaque printing is placed on the front layer 105 over the first larger compartment 102 to prevent viewing of the contents of the first compartment 102. A hang hole 122 is formed in a corner of two of the side seals 112,114.

After the pouch is formed the business card 118 or a dispensary card is inserted through the top seal 108 through the zip seal 130 and into the second compartment opening 104. The product is inserted through the slider top seal 108 and through the zip seal 130 into the first compartment 102.

The encoded NFC tag 120 is mounted to the pouch at the time of dispensing and filling the pouch. The NFC tag is activated by the dispensary and is provided with a code which is associated with customer details such as the prescription and customer identification information. This information is stored in a database. At a future time, the contents and identity of the possessor of the pouch can be verified by persons such as a law enforcement officer who has an NFC tag reader and an application which allows access to the database to view the customer information associated with the NFC code for that pouch. Thus is provided a two-compartment, three side seal pouch with a child-resistant slider zipper sealed onto the long side or top of the pouch.

FIG. 3 illustrates the same pouch of FIGS. 1 & 2 but further including a plurality of vials or bottles 140. The vials 140 are configured to hold THC, cannabis or marijuana oil. Certain states that allow the use of medical marijuana only permit use in oil form. By way of example, Georgia permits the use of low THC oil (less than 5% THC by weight) to treat various conditions. In those states requiring the use of only oil, a configurations such as shown in FIG. 3 will be used and sold. Similarly to the above, the first compartment 102 may be opaque to prevent visibility of the product contained therein. In the present embodiments such as shown in FIG. 3, all walls of the first compartment 102 are opaque. The other elements of the pouch 100, such as illustrated in FIG. 3, are the same as those enumerated above and as illustrated in FIGS. 1 and 2. The vials 140 may be one time use bottles or reclosable.

Figure 4:
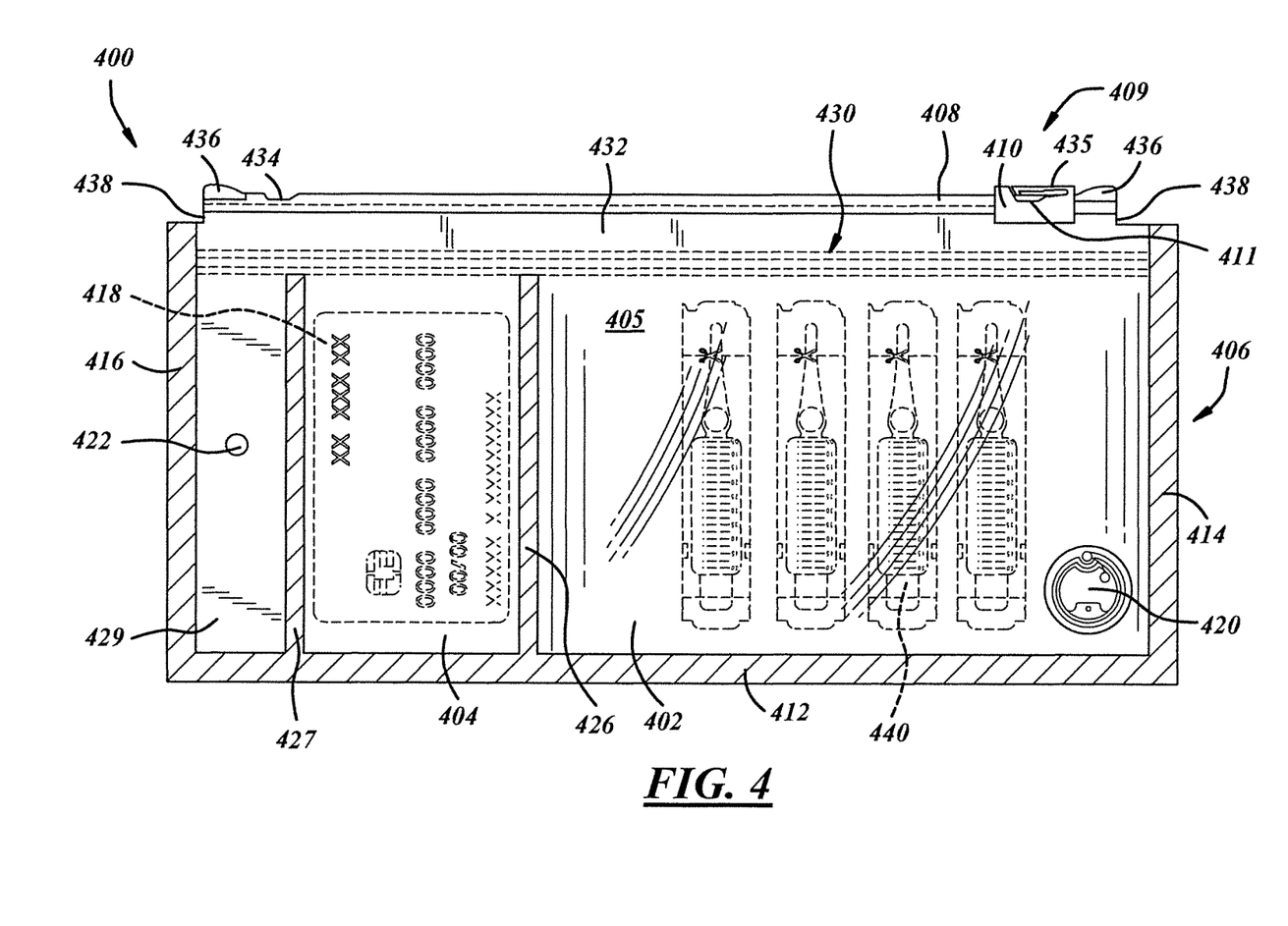
FIG. 4 illustrates an alternative embodiment of FIGS. 1-3.

Now referring to FIG. 4, wherein like elements are numbered identical but increased by 400, an alternative embodiment of the pouch 100 is contemplated. This pouch 400 includes the second compartment 404 formed by two seams, a first seam 426 and a second seam 427 with first seam 426 separating the second compartment 404 from the first compartment 402 and second seam 427 separating the second compartment 404 from side seal 416. Further, the second seam 427 creates an additional panel 429 between the side seal 416 and the second seam 427. The panel 429 does not have space between panels 405, 406 and the panels 405, 406 are sealed together at zip seal 430 down to bottom seal 412. The second seam 427 acts as a barrier between the second compartment 404 and the hole 422 now located in panel 429. The second seam 427 is the same height and width as the first seam 426 and may be formed by heat seal and/or compression between the panels 405, 406. The seams 426, 427 are spaced apart a distance from one another to form the second compartment 404 to accept a card such as a dispensary card and an NFC tag. The seams 426, 427 extend from the bottom seal 412 towards the top but end before the zip seal 430. The portion of the front panel over the second compartment is clear to enable printing on the card to be read through the panels. A layer of opaque printing is placed on the front layer over the first larger compartment to prevent viewing of the contents of the first compartment.

The first and second compartments 402, 404 are generally rectangular pouches or envelopes configured to hold a product wherein the first compartment 402 is wider than the second compartment 404. The upper edge 408 of both the first compartment and the second compartments 402, 404 are sealed and secured by means of a slider assembly 409. Within the assembly 409 is a slider portion 410 that slides along the upper seal 408 either sealing the upper seal 408 in one direction or unsealing in the opposite direction. The slider portion 410 stops and locks at a receiving portion 436 just prior to each edge seal 414, 416 and at the seam notch 438 to allow full access to the compartments 402, 404. The slider 410 has a locking mechanism 411 to prevent unwanted access, for example access by children, into the contents of the first compartment 402 and the second compartment 404. The locking mechanism 411 unlocks the slider portion 410 from the receiving portion 436 by a lever 435. The lever 435 only actuates and thus unlocks when allowed to travel into the lever notch 434 thereby allowing the slidere portion 410 to release from the receiving portion 436. The lever 435 may only fit into the notch 434 when the slider portion 410 is fully seated into the receiving portion 436. Once the slider portion 410 is seated at the receiving portion 436 on either side, the lever 435 locks the slider portion into receiving portion 436.

Figure 5:
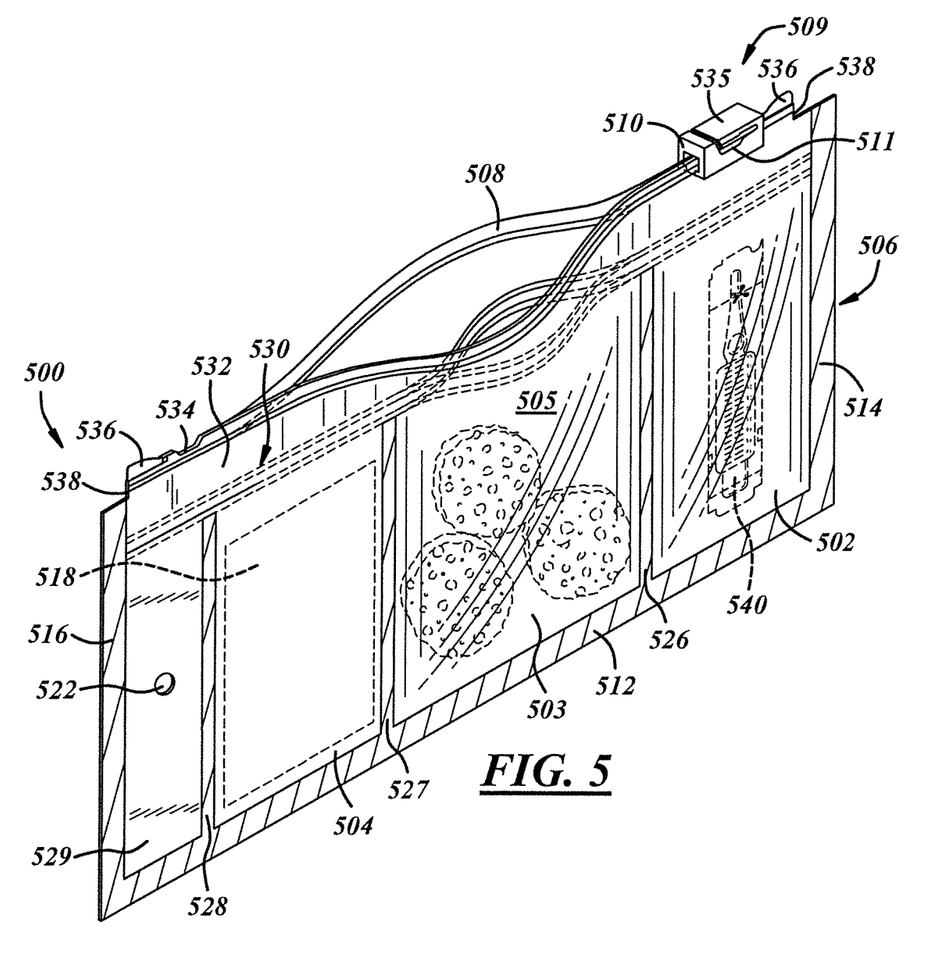
FIG. 5 illustrates an alternative embodiment of FIGS. 1-3 further including a third compartment.
Figure 6:
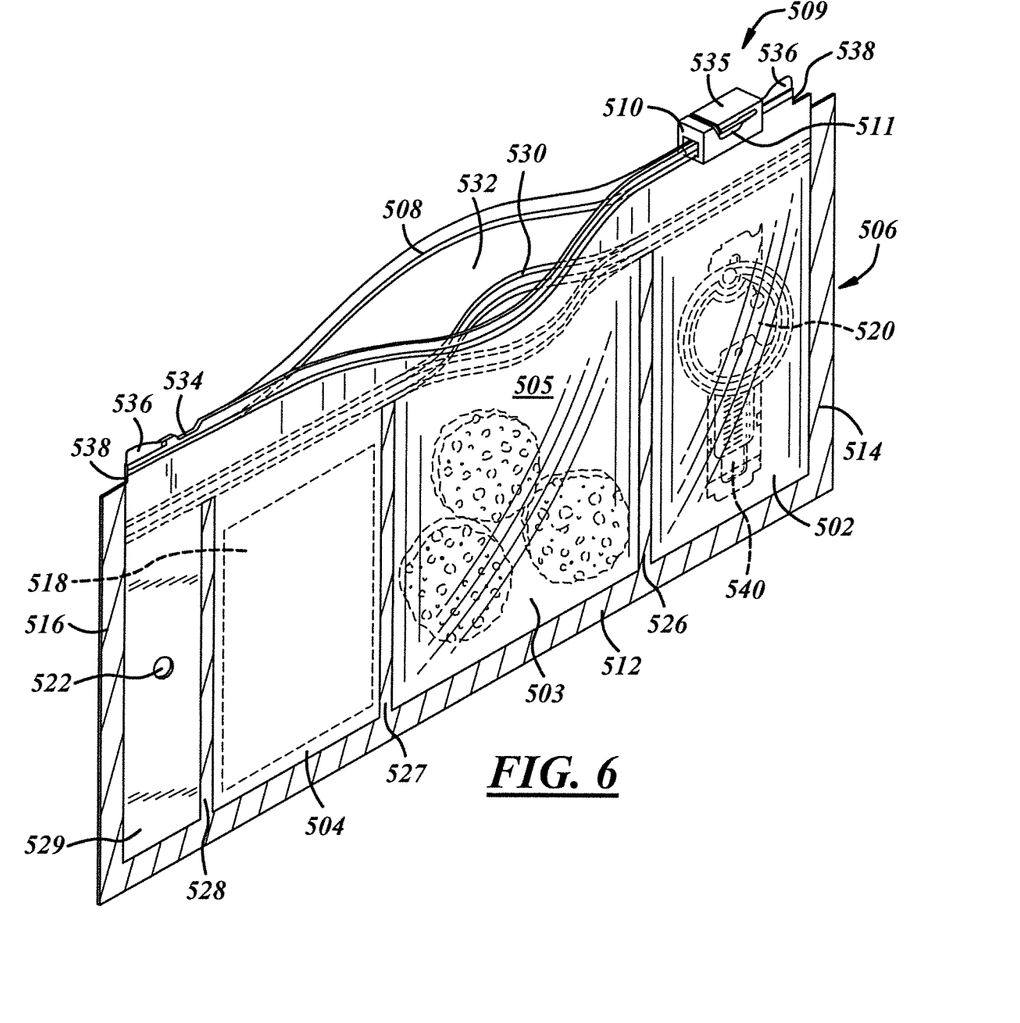
FIG. 6 illustrates a the pouch as shown in FIG. 5 further including a NFC tag.

Now referring to FIGS. 5-6, wherein like elements are numbered identical but increased by 500, another alternative embodiment of the pouch 100 is contemplated. Pouch 500 has three compartments: a first compartment 502, a second compartment 503 and a third compartment 504. The first compartment 502 is configured to hold medical marijuana, the second compartment 503 is configured to hold, without limitation, a snack such as cookies, and the third compartment 504 is configured to hold a business card 518. Alternatively, the third compartment 504 may hold rolling papers, advertisements, information about the product . . . etc.

The compartments 502, 503, 504, are formed from two panels 505, 506. A first panel 505 is sealed to a second panel 506. The pouch 500 is generally rectangular having a plurality of peripheral side seals 512, 514, 516. The seas 512, 514, 516 are preferably air and water tight so as to prevent air or liquid from entering the first compartment 502, the second compartment 503, or the third compartment 504.

The first, second, and third compartments 502, 504. 503 are generally rectangular pouches or envelopes configured to hold a product. In the present embodiment, all three compartments 502, 503, 504 are sealed on all peripheral edges except an upper edge 508. The upper edge 508 of all three compartment 502, 503, 504 are sealed and secured by means of a slider assembly 509. Within the assembly 509 is a slider portion 510 that slides along the upper seal 508 either sealing the upper seal 508 in one direction or unsealing in the opposite direction.

The slider portion 510 stops and locks at a receiving portion 536 just prior to each edge seal 514, 516 and at the seam notch 538 to allow full access to the compartments 502, 503, 504. The slider 510 has a locking mechanism 511 to prevent unwanted access, for example access by children, into the contents of the compartments 502, 503, 504. The locking mechanism 511 unlocks the slider 510 from the receiving portion 536 by a lever 535. The lever 535 only actuate and thus unlock when allowed to travel into the lever notch 534 thereby allowing the slider portion 510 to release from the receiving portion 536. The lever 535 may only fit into the notch 534 with the slider portion 510 is fully seated into the receiving portion 536. Once the slider portion 510 is seated at the receiving portion 536 on either side, the lever 535 locks the slider portion into receiving portion 536.

The first compartment 502 is separated from the second compartment 503 by means of a first seam 526. The first seam 526 acts as a barrier between the first compartment 502 and the second compartment 503. The first seam 526 may be formed by heat seal and/or compression between the panels 505, 506. The third compartment 504 is separated from the second compartment 503 by means of a second seam 527. The second seam 527 acts as a barrier between the second compartment 503 and the third compartment 504. The second seam 527 may be formed by heat seal and/or compression between the panels 505, 506. The third compartment 504 is separated from the edge seal 516 by means of a third seam 528. The third seam 528 forms the outer edge of the third compartment 504 and acts as a barrier between the third compartment 504 and the edge seal 516. Further, the third seam 528 creates an additional panel 529 between the side seal 516 and the third seam 528. The panel 529 does not have a gap between panels 505, 506 and the panels 505, 506 are sealed together at zip seal 530 down to bottom seal 512. Within the panel 529 is the hole 522. The portion of the front panel over the third compartment is clear to enable printing on the card to be read through the panels. A layer of opaque printing is placed on the front layer over the first compartment to prevent viewing of the contents of the first compartment.

All three seals, 526, 527, 528 are the same height and width. Further, the seals 526, 527, 528 extend from the bottom seal 512 towards the top seal 508 but end before the zip seal 530, and may be formed by heat seal and/or compression between the panels 505, 506. As illustrated, the seams 526, 527, 528 are spaced apart a distance from one another and configured so that the second compartment 503 is widen than the other two compartments 502, 504 thereby proving space so that it may hold a snack. Further, the first compartment 502 is configured to hold a vial 540 and may also hold an NFC tag 520. The third compartment is configured to accept a card such as a dispensary card or business card 518. It should be appreciated that the seams 526, 527, 528 may be manufactured to be spaced apart in such a way that the configuration of all compartments may be of equal size. Further, it is contemplated that additional seals may be added to increase the number of compartments.

Figure 7:
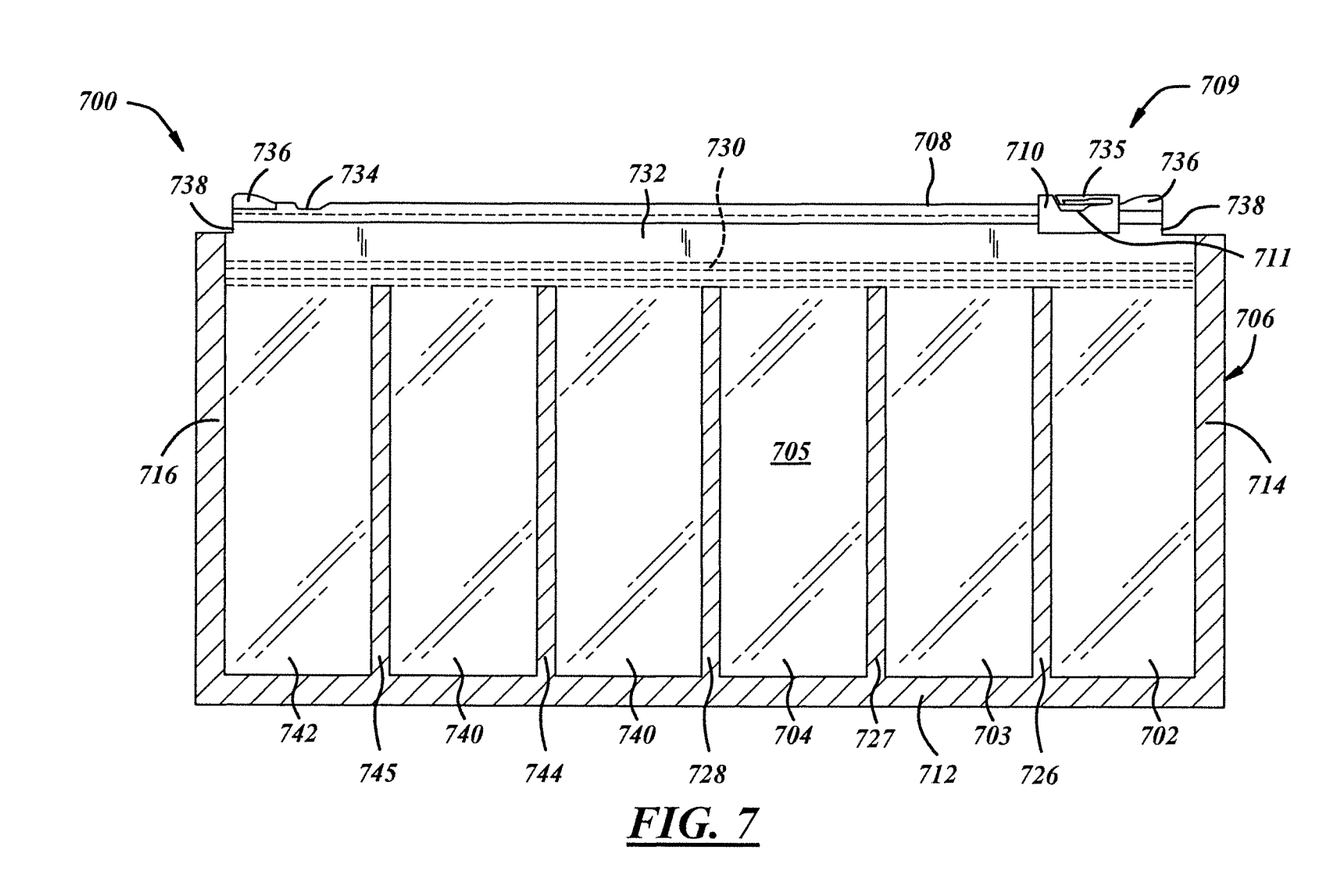
FIG. 7 illustrates an alternative embodiment of FIGS. 1-3 further including a plurality of additional compartments.
Figure 8:
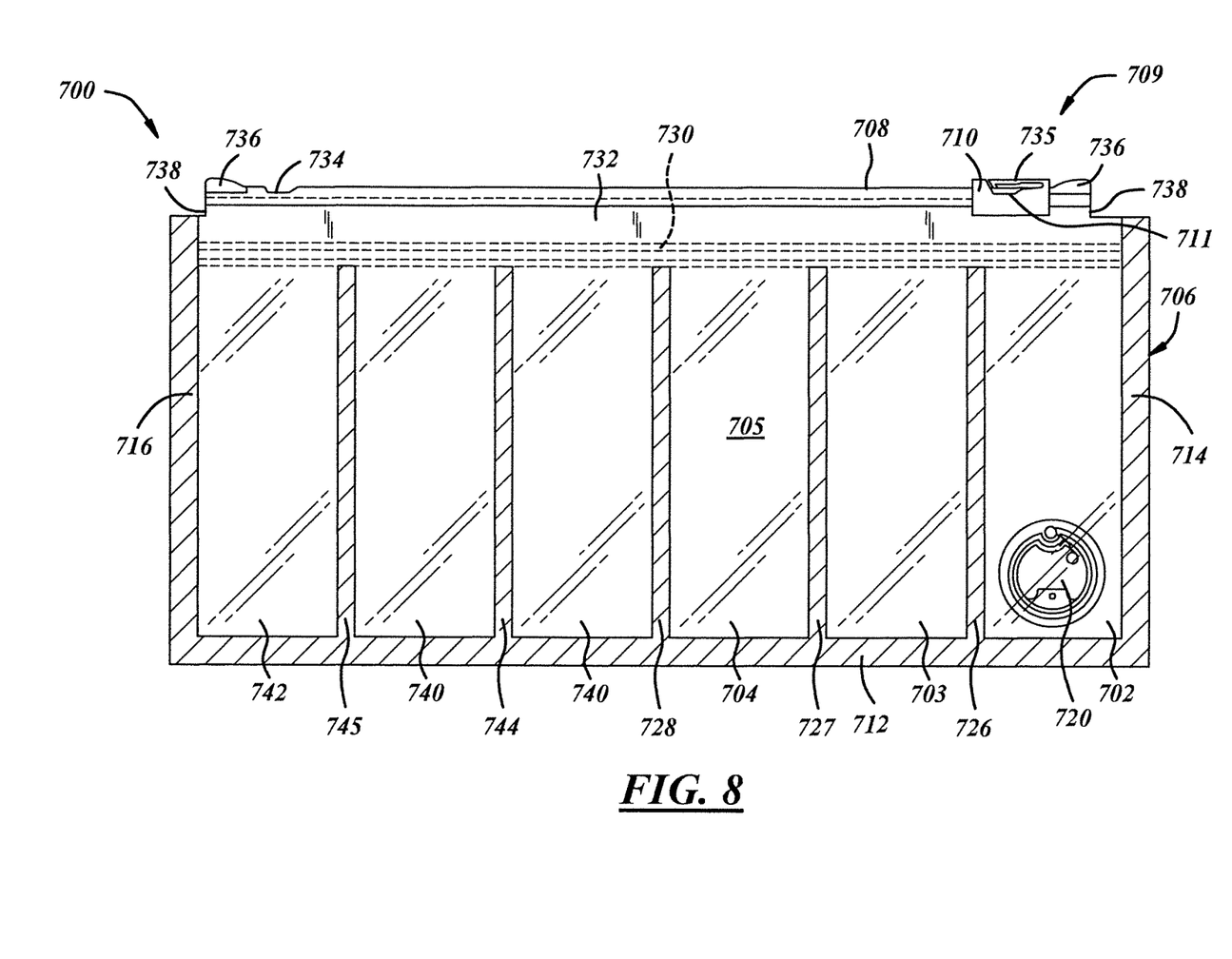
FIG. 8 illustrates the pouch of FIG. 7 further including a NFC tag.

Now referring to FIGS. 7-8, pouch 700 is generally rectangular having a plurality of peripheral side seals 712, 714, 716. The seals 712, 714, 716 are preferably air and water tight so as to prevent air or liquid from entering any of the compartments. The pouch 700 has six equal compartments: first compartment 702, second compartment 703, third compartment 704, fourth compartment 740, fifth compartment 741, and a sixth compartment 742. The compartments are formed by the seals 712, 714, 716 on the sides and by five equal seams: a first seam 726, second seam 727, third seam 728, fourth seam 744, and fifth seam 745. The first seam 726 separates the first compartment 702 from the second compartment 703. The second seam 727 separates the second compartment 703 from the third compartment 704. The third seam 728 separates the third compartment 704 from the fourth compartment 740. The fourth seam 744 separates the fourth compartment 740 from the fifth compartment 741. The fifth seam 745 separates the fifth compartment 741 from the sixth compartment 742. The first compartment 702 is formed by means of a side seal 714 on one side and a first seam 726 on the other. The sixth compartment 742 is formed by means of a side seal 716 and the fifth seam 745. Each of the other compartments are formed by means of seams 726, 727, 728, 744, 745. Each seam 726, 727, 728, 744, 745 are the same height and width and are formed by heat and/or compression between the first and second panels 705, 706. The compartments 702, 703, 704, 740, 741, 742 are formed from two panels 705, 706. A first panel 705 is sealed to a second panel 706.

The compartments 702, 703, 704, 740, 741, 742 are generally rectangular pouches or envelopes configured to hold a product and are sealed on all peripheral edges except an upper edge 708. The upper edge 708 is sealed and secured by means of a slider assembly 709. Within the assembly 709 is a slider portion 710 that slides along the upper seal 708 either sealing the upper seal 708 in one direction or unsealing in the opposite direction. The slider portion 710 stops and locks at a receiving portion 736 just prior to each edge seal 714, 716 and at the seam notch 738 to allow full access to the compartments. The slider 710 has a locking mechanism 711 to prevent unwanted access, for example access by children, into the contents of the compartments. The locking mechanism 711 unlocks the slider portion 710 from the receiving portion 736 by a lever 735. The lever 735 only actuates and thus unlocks when allowed to travel into the lever notch 734 thereby allowing the slidere portion 710 to release from the receiving portion 736. The lever 735 may only fit into the notch 734 when the slider portion 710 is fully seated into the receiving portion 736. Once the slider portion 710 is seated at the receiving portion 736 on either side, the lever 735 locks the slider portion into receiving portion 736.

Below the upper seal 708 and panel 732 is a zip seal 730 that is able to be zip closed thus encasing the upper portion of the compartments 702, 703, 704, 740, 741, 742. The seams 726, 727, 728, 744, 745 end at the base of zip seal 730 and do not extend through zip seal 730 into panel 732. The zip seal 730 may be closed while the top seal 708 is open and vice versa. The zip seal 730 extends horizontally between edge seal 714, 716 and between panels 705, 706. The zip seal 730 may help keep the contents in their respective compartments and/or keep the contents fresh. A portion of the front panel over the certain compartments may be clear to enable printing on a card to be read through the panels. A layer of opaque printing may be placed on the front layer over certain compartments to prevent viewing of the contents of that compartment.

Thus is disclosed a pouch which may be used for tobacco and medical marijuana and other natural materials. Many variations of the pouch are within the scope and spirit of the invention.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. A flexible pouch comprising:
a first panel and a second panel;
a first compartment and a second compartment formed between the first panel and the second panel, an upper seal positioned across the top of the first panel and the second panel above the first compartment and the second compartment, the upper seal having two ends, the first compartment having a first edge seal formed from the first panel and the second panel along a first peripheral edge and a first sidewall formed by a first seam, the first edge seal terminating below the upper seal and outwardly of one of the ends of the upper seal forming a first seam notch between the first peripheral edge and the upper seal, the first compartment being opaque to as to prevent visibility of a plurality of contents of the first compartment;
the second compartment having a second edge seal formed from the first panel and the second panel along a second peripheral edge and a second sidewall formed by the first seam, the second edge seal terminating below the upper seal and outwardly of the other one of the ends of the upper seal forming a second seam notch between the second peripheral edge and the upper seal, the second compartment is transparent;
the first seam is positioned between the first panel and the second panel, and between the first edge seal and the second edge seal, extending vertically from a third edge seal and ending at a position below the upper seal; and
a slider assembly movably attached to the upper seal, the upper seal being resealable between the two ends, the slider assembly securing the first compartment and the second compartment in one direction and permitting access to both the first compartment and the second compartment in an opposite direction; wherein the slider assembly further comprises: a slider portion configured to slide across the upper seal, the seal is secured by the slider portion in one direction and permitting access in the other; a pair of receiving portions, one of the pair of receiving portions abuts the first seam notch and the other one of the pair of receiving portions abuts the second seam notch, the pair of receiving portions extend in a vertical direction above the seal, each one of the pair of receiving portions receive the slider portion at the respective end of the upper seal; a locking mechanism portion having a lever is disposed on the slider portion, the locking mechanism portion is configured to lock the slider portion into the receiving portion when received in either one of the pair of the receiving portions; and a lever notch is positioned adjacent to each one of the pair of receiving portions, wherein the slider portion is released from either one of the pair of the receiving portions by the lever of the locking mechanism portion, the lever releases the slider portion when the lever is engaged into the lever notch, the lever notch is only accessible when the slider portion is seated within either one of the pair of receiving portions.

2. The flexible pouch of claim 1 wherein the first compartment and the second compartment are secured by a zip seal, the zip seal extends a length of the first panel and the second panel between the first edge seal and the second edge seal, the zip seal is positioned below the upper seal and above the first seam, the first compartment and the second compartment.

3. The flexible pouch of claim 2 wherein the zip seal being resealable, the zip seal permitting access to both the first compartment and the second compartment.

4. The flexible pouch of claim 1 wherein the first compartment and the second compartment are resealable.

5. The flexible pouch of claim 1 wherein an NFC tag is connected to the flexible pouch, the NFC tag adapted to store readable information relating to an origination of the plurality of contents of the flexible pouch.

6. The flexible pouch of claim 5 wherein the NFC tag is affixed to the exterior of the flexible pouch.

7. The flexible pouch of claim 6 wherein the NFC tag in contained within either the first compartment or the second compartment.

8. A flexible pouch comprising:
a first panel and a second panel;
a first compartment, a second compartment, and a third compartment formed between the first panel and the second panel, an upper seal positioned across the top of the first panel and the second panel above the first compartment, the second compartment, and the third compartment, the upper seal having two ends;
the first compartment having a first edge seal formed from the first panel and the second panel along a first peripheral edge and a first sidewall by a first seam, the first edge seal terminating below the upper seal and outwardly of one of the ends of the upper seal forming a first seam notch between the first peripheral edge and the upper seal, the first compartment being opaque to prevent visibility of a plurality of contents of the first compartment;
the second compartment having a second sidewall formed from the first seam and a third sidewall formed from a second seam, the second compartment is wider than the first compartment and the third compartment;
the third compartment having a fourth sidewall formed from the second seam and a third seam;
the first seam, the second seam and the-third seam are formed between the first panel and the second panel, and between the first edge seal and a second edge seal, the second edge seal formed from the first panel and the second panel along a second peripheral edge, the second edge seal terminating below the upper seal and outwardly of the other one of the ends of the upper seal forming a second seam notch between the second peripheral edge and the upper seal;
the first seam, the second seam and the third seam each extend vertically from a third edge seal and each terminate below the upper seal;
a spacer panel is disposed between the third seam and the second edge seal, the spacer panel is formed by the first panel and the second panel, the spacer panel does not have a compartment;
a slider assembly movably attached to the upper seal, the upper seal being resealable between the two ends, the slider assembly securing the first compartment, the second compartment, the third compartment and the spacer panel in one direction and permitting access to the first compartment, the second compartment and the third compartment in an opposite direction; wherein the slider assembly further comprises: a slider portion configured to slide across the upper seal, the upper seal is secured by the slider portion in one direction and permitting access in the other; a pair of receiving portions, one of the pair of receiving portions abuts the first seam notch and the other one of the pair of receiving portions abuts the second seam notch, the pair of receiving portions extend in a vertical direction above the seal, the pair of receiving portions receive the slider portion at the respective end of the upper seal; a locking mechanism portion having a lever is disposed on the slider portion, the locking mechanism portion is configured to lock the slider portion into the receiving portion when received in the either one of the pair of receiving portions; and a lever notch positioned adjacent to each one of the pair of receiving portions, wherein the slider portion is released from either one of the pair of the receiving portions by the lever when the lever is engaged into the lever notch, the lever notch is only accessible when the slider portion is seated within either one of the pair of receiving portions.

9. The flexible pouch of claim 8 wherein the first compartment, the second compartment, and the third compartment are secured by a zip seal, the zip seal extends a length of the first panel and the second panel between the first edge seal and the second edge seal, the zip seal is positioned below the upper seal and the slider assembly, the zip seal is positioned above the first compartment, the second compartment, and the third compartment.

10. The flexible pouch of claim 9 wherein the zip seal being resealable, the zip seal permitting access to the first compartment, the second compartment and the third compartment.

11. The flexible pouch of claim 9 wherein the first seam, the second seam, and the third seam are formed from a third edge seal and end at a base of the zip seal.

12. The flexible pouch of claim 8 wherein an NFC tag is connected to the flexible pouch, the NFC tag adapted to store readable information relating to an origination of a plurality of contents of the flexible pouch.

13. The flexible pouch of claim 12 wherein the NFC tag is affixed to the exterior of the flexible pouch.

14. The flexible pouch of claim 13 wherein the NFC tag is contained within the first compartment, the second compartment or the third compartment.

15. The flexible pouch of claim 8 wherein a business card and/or information about a dispensary and a plurality of contents are inserted into the third compartment.

16. The flexible pouch of claim 8 wherein the first compartment is opaque, the second compartment and the third compartment are transparent to allow an user to view any contents contained within the second compartment and the third compartment.

17. The flexible pouch of claim 8, wherein the spacer panel has a hole.

18. The flexible pouch of claim 8, wherein at least four seams are present and at least four compartments that are equally spaced.

\* \* \* \* \*